United States Patent
Ahn et al.

(10) Patent No.: US 12,429,906 B2
(45) Date of Patent: Sep. 30, 2025

(54) DISPLAY DEVICE AND METHOD FOR MANUFACTURING THE SAME

(71) Applicant: Samsung Display Co., LTD., Yongin-si (KR)

(72) Inventors: Sungsang Ahn, Yongin-si (KR); Youngmin Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 24 days.

(21) Appl. No.: 18/514,582

(22) Filed: Nov. 20, 2023

(65) Prior Publication Data

US 2024/0264630 A1    Aug. 8, 2024

(30) Foreign Application Priority Data

Feb. 7, 2023    (KR) .................. 10-2023-0016119

(51) Int. Cl.
*G06F 1/16*    (2006.01)

(52) U.S. Cl.
CPC .......... *G06F 1/1624* (2013.01); *G06F 1/1656* (2013.01)

(58) Field of Classification Search
CPC .... G06F 1/1624; G06F 1/1652; G06F 1/1637; G06F 2203/04102
See application file for complete search history.

(56) References Cited

U.S. PATENT DOCUMENTS

| 2021/0200273 | A1  | 7/2021  | Hong et al. |
| 2022/0150337 | A1  | 5/2022  | Lee et al. |
| 2022/0171429 | A1* | 6/2022  | Kim ............... G06F 1/1652 |
| 2023/0110625 | A1* | 4/2023  | Hong ............. G06F 1/1637 |
|              |     |         | 361/807 |
| 2023/0421674 | A1* | 12/2023 | Park ............... H04M 1/0268 |

FOREIGN PATENT DOCUMENTS

| CN | 114694491 A    | 7/2022 |
| KR | 1020210083442 A | 7/2021 |
| KR | 1020220061823 A | 5/2022 |
| KR | 1020220077429 A | 6/2022 |

* cited by examiner

*Primary Examiner* — Allen L Parker
*Assistant Examiner* — Dakota M Talbert
(74) *Attorney, Agent, or Firm* — CANTOR COLBURN LLP

(57) ABSTRACT

A display device includes: a display module including a bending part and a flat part; a support plate including first and second portions; and a sliding part that accommodates the support plate. The sliding part includes: a first guide part including first and second supports, each of which defines a groove therein extending in the first direction and which are spaced apart from each other in a second direction crossing the first direction, and a first connecting part; and a second guide part including a third support disposed in the groove of the first support, a fourth support disposed in the groove of the second support, and a second connecting part. The bending part and the first portion are bent with respect to the second connecting part, and the first portion has opposite ends disposed in the groove of the first support and the groove of the second support, respectively.

19 Claims, 16 Drawing Sheets

DISPLAY DEVICE AND METHOD FOR MANUFACTURING THE SAME

This application claims priority to Korean Patent Application No. 10-2023-0016119, filed on Feb. 7, 2023, and all the benefits accruing therefrom under 35 U.S.C. § 119, the content of which in its entirety is herein incorporated by reference.

BACKGROUND

The present disclosure herein relates to a display device including a digitizer, and more particularly, to a display device including a digitizer, in which shielding performance and sensing performance of a folding part is improved.

An electronic device such as smartphones, digital cameras, notebook computers, navigation devices and smart televisions, which provide a user with images, includes a display device for displaying images. The display device generates the images and provides the user with the images through a display screen.

With the technical development of the display device, display devices having various shapes are being developed. For example, various display devices are being developed which are changed to a curved surface shape, perform repeatedly a sliding operation to be folded or unfolded, or are expandable or reducible. The display device may be portable and improve user's convenience.

SUMMARY

The present disclosure provides a display device capable of easily performing a sliding operation, and a method for manufacturing the display device.

An embodiment of the invention provides a display device including: a display module, which includes a bending part and a flat part extending from the bending part in a first direction, a support plate, which is disposed below the display module and includes a first portion overlapping the bending part and a second portion overlapping the flat part, and a sliding part which accommodates at least a portion of the support plate. The sliding part includes a first guide part including a first support and a second support, each of which defines a groove therein extending in the first direction and which are spaced apart from each other in a second direction crossing the first direction, and a first connecting part which is connected to each of the first support and the second support, and a second guide part including a third support disposed in the groove of the first support, a fourth support disposed in the groove of the second support, and a second connecting part connected to each of the third support and the fourth support. The bending part and the first portion are bent with respect to the second connecting part, and the first portion has opposite ends that are disposed in the groove of the first support and the groove of the second support, respectively.

In an embodiment, the display module may have a width that gradually increases in the first direction as a mode is changed from a first mode to a second mode.

In an embodiment, the groove of each of the first support and the second support may be defined by a first inner surface and a second inner surface, which face each other in a third direction crossing the first direction and the second direction, and a third inner surface which connects the first inner surface and the second inner surface to each other and has a curved surface. The first inner surface may have one portion that faces the flat part of the display module, and the third inner surface may be disposed between and connected to the first inner surface and the second inner surface such that the first to third inner surfaces may form a "U" shape.

In an embodiment, the first portion may include support bars, which are arranged in the first direction and extend in the second direction, and the number of the support bars disposed between the second inner surface and the second guide part in the first mode may be larger than the number of the support bars disposed between the second inner surface and the second guide part in the second mode.

In an embodiment, one surface of the second connecting part, which faces the third inner surface, may have at least a portion that is a curved surface.

In an embodiment, the second connecting part may be gradually away from a boundary between the first portion and the second portion as the mode is changed from the first mode to the second mode.

In an embodiment, the display device may further include a body part in which the first support and the second support are accommodated, and the first connecting part may be gradually away from the body part in the first direction as the mode is changed from the first mode to the second mode.

In an embodiment, the second guide part may further include a rolling part disposed in the second connecting part and provided with at least one roller.

In an embodiment, the rolling part may be provided in plurality, and the plurality of rolling parts may be spaced apart from each other in the second direction.

In an embodiment, the display device may further include an upper plate disposed between the display module and the support plate and having an opening portion in a region overlapping the bending part.

In an embodiment, the display device may further include a circuit board connected to one end of the flat part and having one portion that is bent to face the support plate.

In an embodiment, each of the grooves may have a width that is greater than a width of each of the third support and the fourth support in the first direction.

In an embodiment, the first connecting part and the second connecting part may be spaced apart from each other by a predetermined distance in the first direction.

In an embodiment, the display module may include a display panel that provides an image, an input sensing part disposed on the display panel, an anti-reflective layer disposed on the input sensing part, a window disposed on the anti-reflective layer, and a protective film disposed below the display panel.

In an embodiment, the second guide part may further include a reinforcement part disposed between the third support and the fourth support.

In an embodiment of the invention, a display device manufacturing method includes: preparing a first guide part that includes a first support and a second support, each of which defines a groove therein extending in a first direction and which are spaced apart from each other in a second direction crossing the first direction, and a first connecting part connected to each of the first support and the second support; and inserting a panel module and a second guide part into the groove of each of the first support and the second support in the first direction. In the inserting of the panel module and the second guide part, the panel module includes a first portion having one region having a curvature, and a second portion connected to the first portion, the one region is inserted to be close to the first connecting part in the first direction, and the panel module is disposed between the first guide part and the second guide part in the groove of each of the first support and the second support.

In an embodiment, the second guide part may include a rolling part provided with at least one roller, and the rolling part may be disposed to face the one region.

In an embodiment, the second guide part may include a second connecting part, in which the roller is disposed, and a third support and a fourth support, each of which is connected to the second connecting part and extends in the first direction and which are spaced apart from each other in the second direction. The third support may be disposed in the groove of the first support, and the fourth support may be disposed in the groove of the second support.

In an embodiment of the invention, a display device includes: a display module, which includes a bending part having one portion bendable to have a curvature and a flat part arranged with the bending part in a first direction: a support plate, which includes a first portion overlapping the bending part and a second portion overlapping the flat part and supports the display module: a first guide part, which defines a first groove and a second groove therein, each of which extends in the first direction and which are spaced apart from each other in a second direction crossing the first direction; and a second guide part which includes a rolling part and is inserted into each of the first groove and the second groove. The first portion has opposite ends that are disposed inside the first groove and the second groove, respectively, the rolling part is in contact with a portion of the first portion, which has a curvature, and the portion of the first portion, which has the curvature, is gradually away from the second portion as a mode is changed from a first mode to a second mode.

In an embodiment, the first guide part may include a first connecting part extending in the second direction, and a first support and a second support, each of which is connected to the first connecting part and in which the first groove and the second groove are defined, respectively, and the second guide part may include a second connecting part facing the first connecting part in the first direction and extending in the second direction, a third support disposed inside the first groove, and a fourth support disposed inside the second groove.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1:
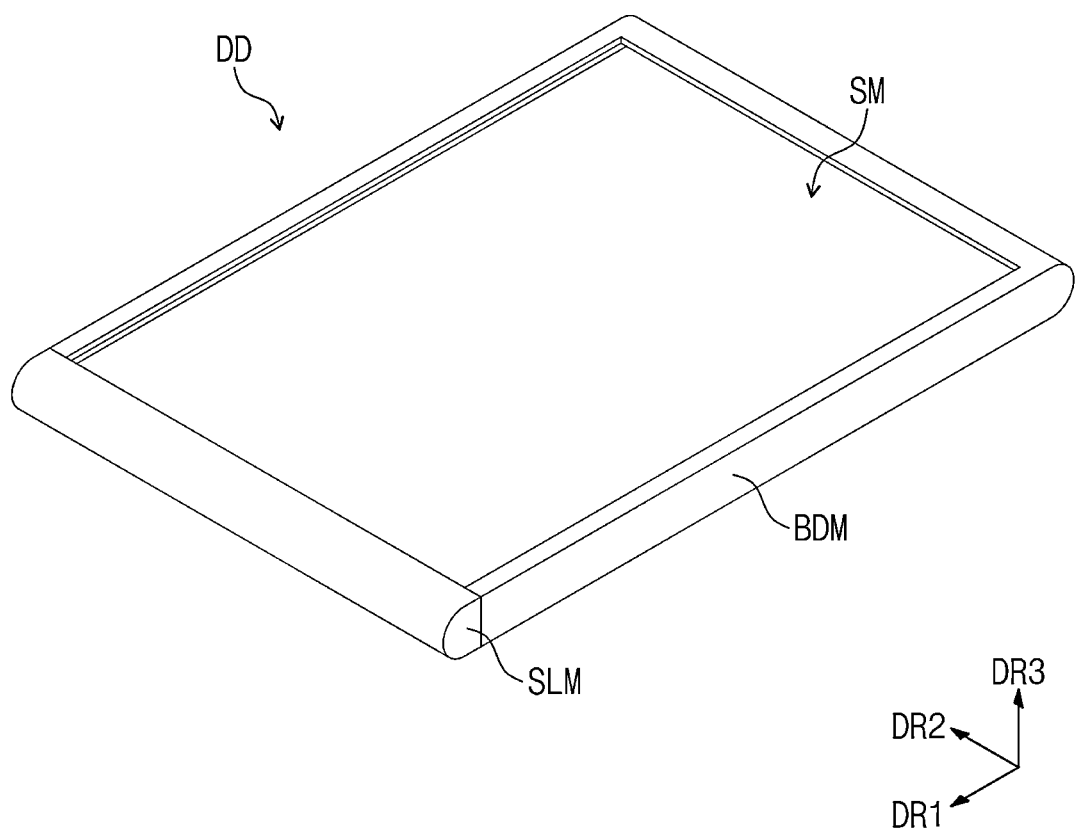
FIG. 1 is a perspective view of a display device in a first mode according to an embodiment of the invention.

It will be understood that when an element (or region, layer, section, etc.) is referred to as being "on", "connected to" or "coupled to" another element, it can be disposed directly on, connected or coupled to the other element or a third intervening elements may be disposed between the elements.

Like reference numbers or symbols refer to like elements throughout. In addition, in the drawings, the thickness, the ratio, and the dimension of elements are exaggerated for effective description of the technical contents. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes one or more combinations which may be defined by relevant elements.

It will be understood that, although the terms "first", "second", etc. may be used herein to describe various elements, these elements should not be limited by these terms. These terms are only used to distinguish one element from another element. For example, a first element could be termed a second element without departing from the teachings of the present invention, and similarly, a second element could be termed a first element. As used herein, the singular forms are intended to include the plural forms as well, unless the context clearly indicates otherwise.

In addition, the terms, such as "below", "beneath", "on" and "above", are used for explaining the relation of elements shown in the drawings. The terms are relative concept and are explained based on the direction shown in the drawing.

It will be further understood that the terms such as "includes" or "has", when used herein, specify the presence of stated features, numerals, steps, operations, elements, parts, or the combination thereof, but do not preclude the presence or addition of one or more other features, numerals, steps, operations, elements, parts, or the combination thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the invention will be described with reference to the accompanying drawings.

Figure 2:
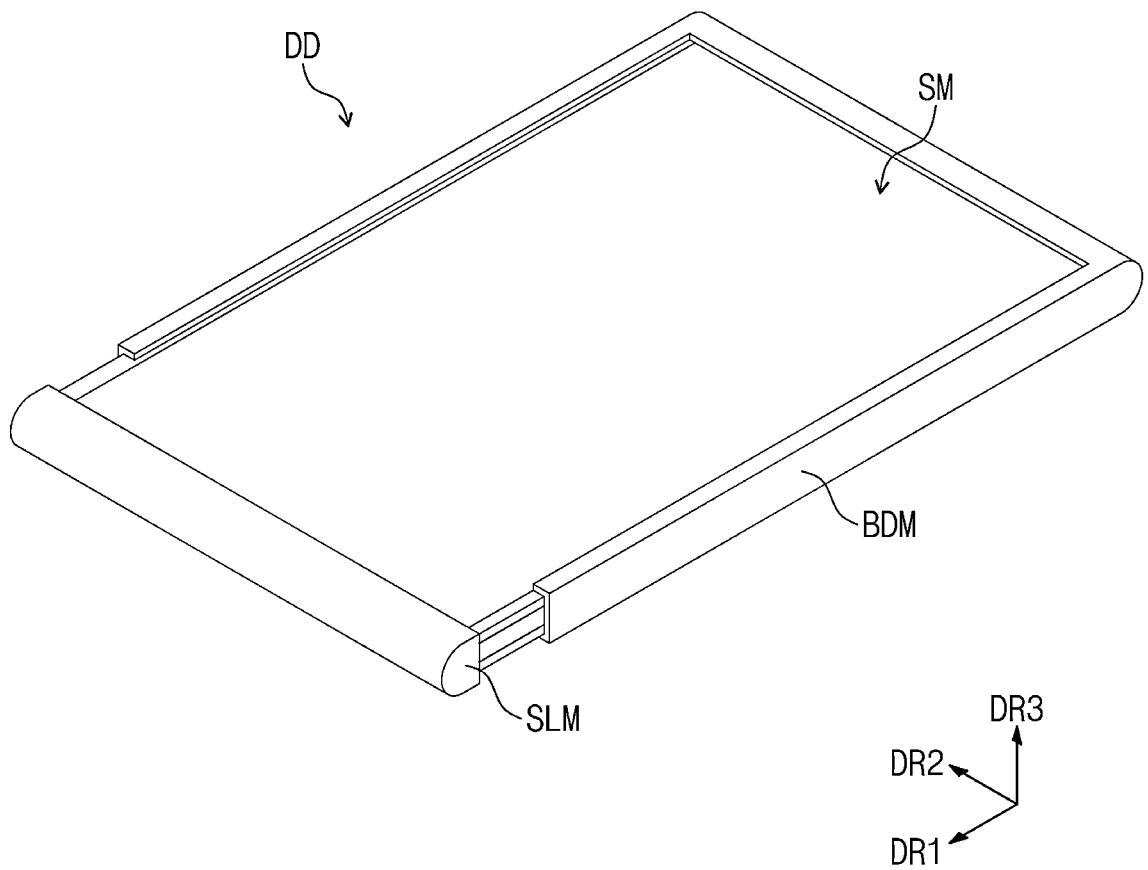
FIG. 2 is a perspective view of a display device in a second mode according to an embodiment of the invention.
Figure 3:
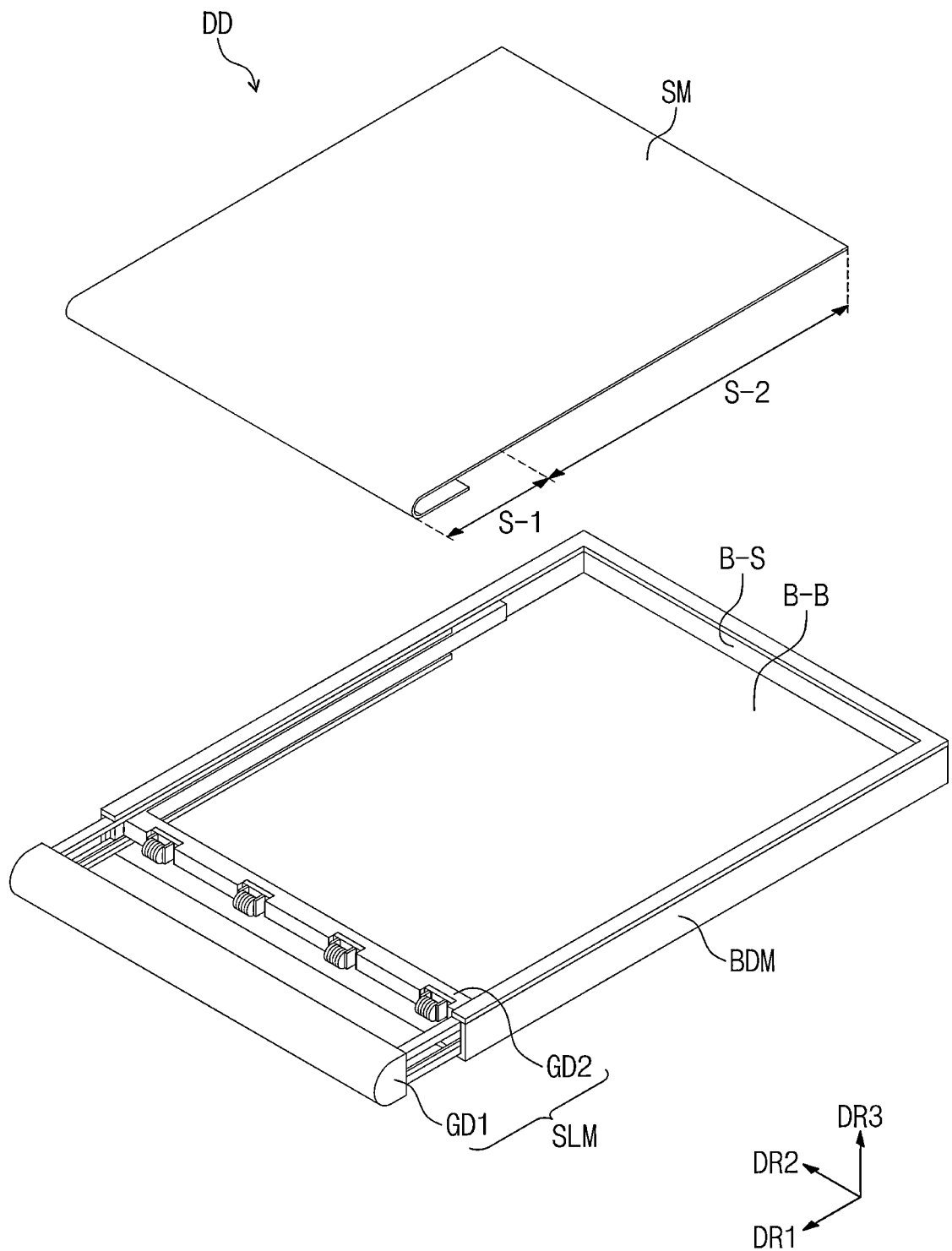
FIG. 3 is an exploded perspective view of a display device according to an embodiment of the invention.
Figure 4:
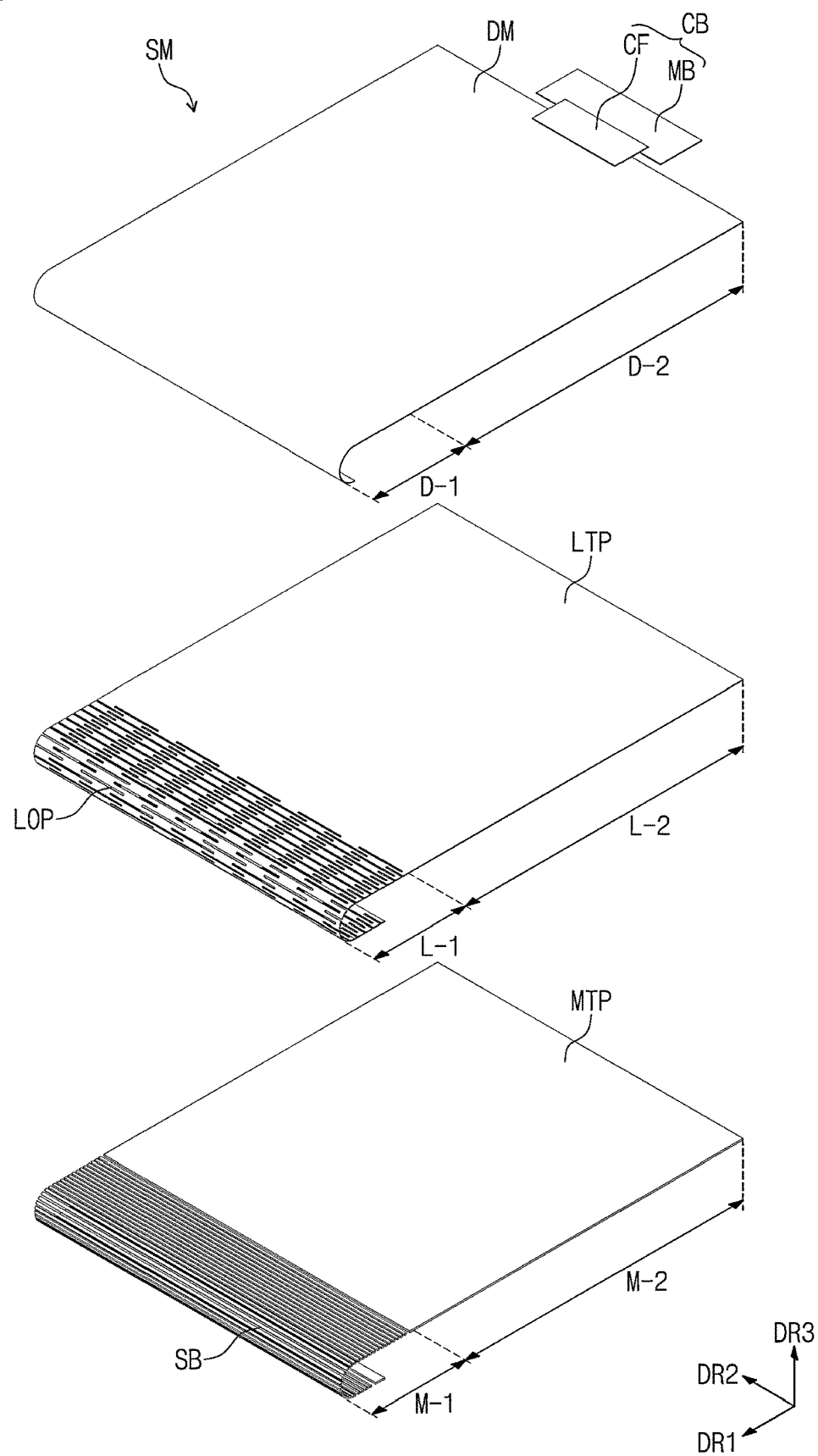
FIG. 4 is an exploded perspective view of a panel module according to an embodiment of the invention.

FIG. 1 is a perspective view of a display device in a first mode according to an embodiment of the invention. FIG. 2 is a perspective view of a display device in a second mode according to an embodiment of the invention. FIG. 3 is an exploded perspective view of a display device according to an embodiment of the invention. FIG. 4 is an exploded perspective view of a panel module according to an embodiment of the invention.

Referring to FIGS. 1 and 2, a display device DD according to an embodiment of the invention may have a rectangular shape with long sides extending in a first direction DR1 and short sides extending in a second direction DR2 crossing the first direction DR1. However, an embodiment of the invention is not limited thereto, and the short sides included the display device DD may extend in the first direction DR1 and the long sides may extend in the second direction DR2 in another embodiment. The display device DD according to an embodiment may be a flexible display device DD.

Hereinafter, a third direction DR3 is defined as a direction substantially perpendicularly crossing a plane defined by the first direction DR1 and the second direction DR2. The state "on a plan view" used herein may be defined as a state as viewed in the third direction DR3.

The display device DD may include a panel module SM, a body part BDM, and a sliding part SLM. The panel module SM may include a display panel DP (see FIG. 8) that provides an image, and an input sensing part ISP (see FIG. 8) that detects an external input. A window WIN (see FIG. 8) that provides a display surface of the display device DD may be disposed at the outermost side of the panel module SM. Here, the "display surface" may mean a surface of the display device DD that provides an image through the window WIN. The panel module SM will be described later.

The sliding part SLM may move in the first direction DR1 to be moved in a direction that is away from or close to the body part BDM. According to an embodiment of the invention, when the sliding part SLM is moved from the body part BDM in the first direction DR1, an area of the panel module SM visible to a user may be changed.

The panel module SM may have one side coupled to the sliding part SLM and the other side fixed to the body part BDM. Here, the sliding part SLM may guide the panel module SM such that the panel module SM changes in shape. An operation of the sliding part SLM may be changed by a user's use state.

In the present disclosure, a state in which the area of the panel module SM visible to a user gradually decreases on a plan view may be defined as a "first mode". The area of the panel module SM visible to a user in one state of the first mode may be the minimum of the area. In addition, a state in which the area of the panel module SM visible to a user gradually increases on a plan view may be defined as a "second mode". The area of the panel module SM visible to a user in one state of the second mode may be the maximum of the area.

The first mode and the second mode of the display device DD may be implemented by moving a first guide part GD1 (see FIG. 3) of the sliding part SLM from the body part BDM in the first direction in a state in which a user grips the body part BDM, or by moving the body part BDM from the first guide part GD1 (see FIG. 3) in the first direction in a state in which the user grips the sliding part SLM.

Referring to FIG. 3, the display device DD according to an embodiment of the invention may include a panel module SM, a sliding part SLM, and a body part BDM. The panel module SM, the sliding part SLM, and the body part BDM may define an outer appearance of the display device DD in a state of being coupled to each other. However, an embodiment of the invention is not limited thereto, and the display device DD according to another embodiment may further include a separate housing in which the sliding part SLM and the body part BDM are accommodated and which is coupled to the panel module SM to define the outer appearance of the display device DD.

The display device DD according to an embodiment may further include a control module, which guides the sliding part SLM such that spacing between the sliding part SLM and the body part BDM is maintained to be constant when the sliding part SLM is fixed to the body part BDM or the mode of the display device DD is changed. The control module may include at least one gear and a rail, and may be operated by a separate driving motor or the like.

The panel module SM may include a first portion S-1 having one portion that is bendable with a predetermined curvature, and a second portion S-2 connected to the first portion S-1. A portion of the panel module SM, which is changed in shape when a mode of the display device DD is changed, may be the first portion S-1. Thus, when the mode is changed, a portion of the first portion S-1, which has a curvature, may be moved within the first portion S-1 in the first direction DR1.

The body part BDM may include a bottom surface B-B and a plurality of side surfaces B-S connected to the bottom surface B-B. The bottom surface B-B and the side surfaces B-S may be connected to each other to provide a space in which the panel module SM and the sliding part SLM are disposed.

The sliding part SLM may include a first guide part GD1 and a second guide part GD2. The second guide part GD2 may be fitted into a predetermined space defined in the first guide part GD1. The first portion S-1 of the panel module SM together with the second guide part GD2 may be coupled to the first guide part GD1. The first guide part GD1 and the second guide part GD2 will be described later.

Referring to FIG. 4, the panel module SM may include a display module DM, an upper plate LTP, and a support plate MTP. The panel module SM according to an embodiment may include a circuit board CB connected to the display module DM.

The display module DM may include a bending part D-1, which overlaps the first portion S-1 of the panel module SM, and a flat part D-2 which is connected to the bending part D-1 and overlaps the second portion S-2 of the panel module SM. The display module DM may be coupled to the upper plate LTP through a separate adhesive layer. The display module DM may include the display panel DP (see FIG. 8) that provides an image, and the input sensing part ISP (see FIG. 8) that detects an external input. This will be described later.

The circuit board CB may be connected to one end of the flat part D-2. The circuit board CB may be disposed in a peripheral region of the flat part D-2, which is not provided with the image. The circuit board CB may include a flexible board CF and a main board MB connected to the flexible board CF. The flexible board CF may include an insulation film and conductive lines mounted on the insulation film. The conductive lines are connected to pads (see FIG. 9), which are included in the display panel DP (see FIG. 9), to electrically connect the circuit board CB and the display module DM to each other. The flexible board CF may further include a driving chip mounted in the flexible board CF. The flexible board CF may have one portion, which is bent to face a rear surface of the support plate MTP, and may be accommodated in the body part BDM (see FIG. 3) in a bent state. Accordingly, the main board MB may be disposed on the rear surface of the support plate MTP to be stably accommodated in a space provided by the body part BDM (see FIG. 1).

However, an embodiment of the invention is not limited thereto. The circuit board CB may be omitted and the driving chip may be directly mounted in the flat part D-2 in another embodiment. Here, the flat part D-2 may have one portion that is accommodated in the body part BDM (see FIG. 3) in a bent state.

The upper plate LTP may be disposed below the display module DM. The upper plate LTP may have a top surface that is attached to a bottom surface of the display module DM. The upper plate LTP may include a first portion L-1, which overlaps the first portion S-1 of the panel module SM, and a second portion L-2 which is connected to the first portion L-1 and overlaps the second portion S-2 of the panel module SM. The first portion L-1 may be a portion that is changed in shape when a mode of the display device DD is changed.

The first portion L-1 may include opening portions LOP. Each of the opening portions LOP may be defined to pass through the first portion L-1 from a top surface to a bottom surface. As the first portion L-1 includes the opening portions LOP, the first portion L-1 may have lower rigidity than the second portion L-2. Thus, when a mode of the display device DD is changed, the shape of the first portion L-1 may be easily changed.

The upper plate LTP may include a metal or a non-metal material. In an embodiment, for example, the metal may include stainless steel (e.g., SUS 316).

The support plate MTP may be disposed in a lower portion of the upper plate LTP. The support plate MTP may have a top surface that is attached to a bottom surface of the upper plate LTP. The support plate MTP and the upper plate LTP may be coupled to each other by welding. However, a combinational relationship between the support plate MTP and the upper plate LTP is not limited thereto, and the support plate MTP and the upper plate LTP may be fixed to each other through bolt-nut-coupling or fitting-coupling, or may be coupled to each other through a separate adhesive layer in another embodiment.

The support plate MTP may include a first portion M-1, which overlaps the first portion S-1 of the panel module SM, and a second portion M-2 (plate) which is arranged with the first portion M-1 in the first direction DR1 and overlaps the second portion S-2 of the panel module SM. The first portion M-1 may be a portion that is changed in shape when a mode of the display device DD is changed.

The first portion M-1 may include support bars SB, each of which extends in the second direction DR2 and which are arranged in the first direction DR1. Joint portions may be disposed between two of the support bars SB, which are adjacent to each other in the first direction DR1. The joint portions may be spaced part from each other between the two support bars SB in the second direction DR2. Thus, when a mode of the display device DD is changed, an angle between the adjacent support bars SB may be easily adjusted by the joint portions.

The support bars SB may guide the first portion L-1 of the upper plate LTP and the bending part D-1 of the display module DM, which are disposed above the support plate MTP, such that the shape of each of the first portion L-1 and the bending part D-1 is changed when a mode of the display device DD is changed. In addition, even when the shape of the first portion S-1 of the panel module SM is changed, components of the panel module SM disposed above the support bars SB may be prevented from being changed in the second direction DR2.

The support plate MTP may include a metal or a non-metal material. In an embodiment, for example, the metal may include stainless steel (e.g., SUS 316).

According to an embodiment, the opening portions LOP of the upper plate LTP may overlap the support bars SB. However, an embodiment of the invention is not limited thereto, and the support bars SB may not overlap the opening portions LOP in another embodiment. Here, the shape of the opening portions LOP may be more easily changed.

Figure 5A:
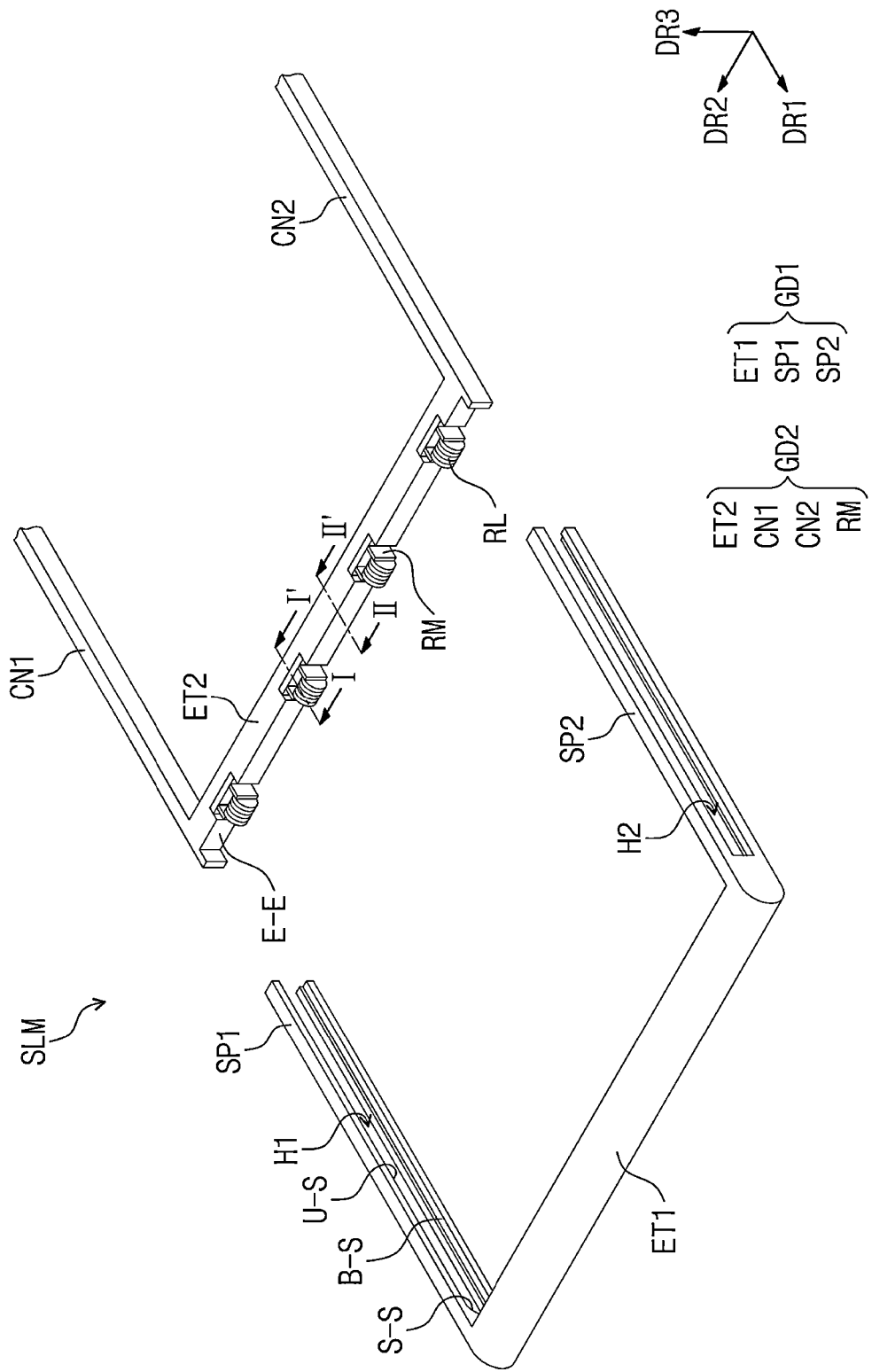
FIG. 5A is an exploded perspective view of a sliding part according to an embodiment of the invention.
Figure 5B:
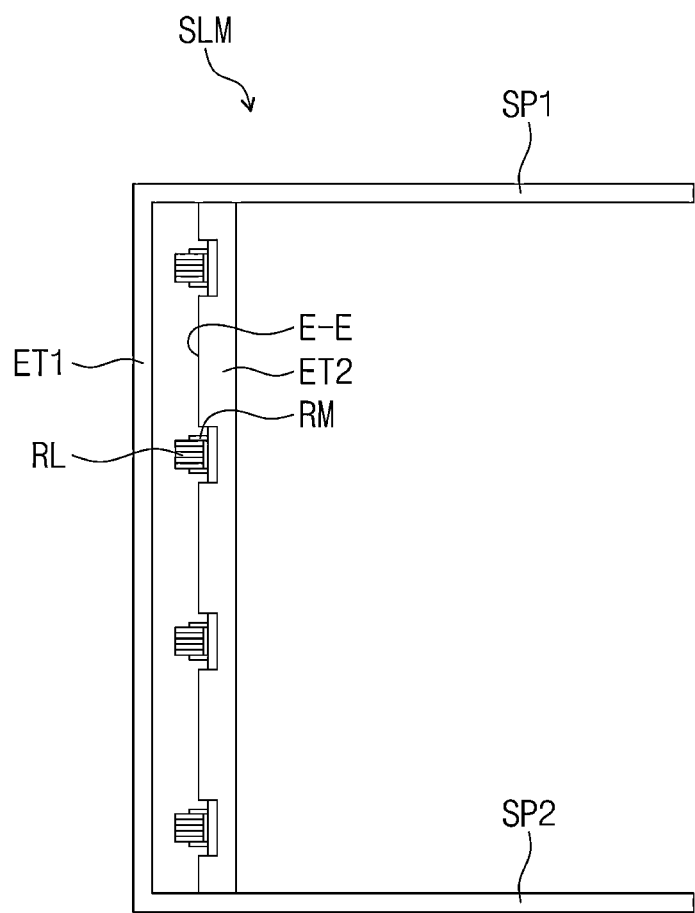
FIG. 5B is a plan view of a sliding part according to an embodiment of the invention.
Figure 5B:
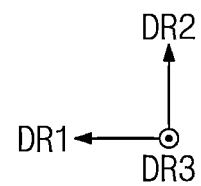
Figure 6A:
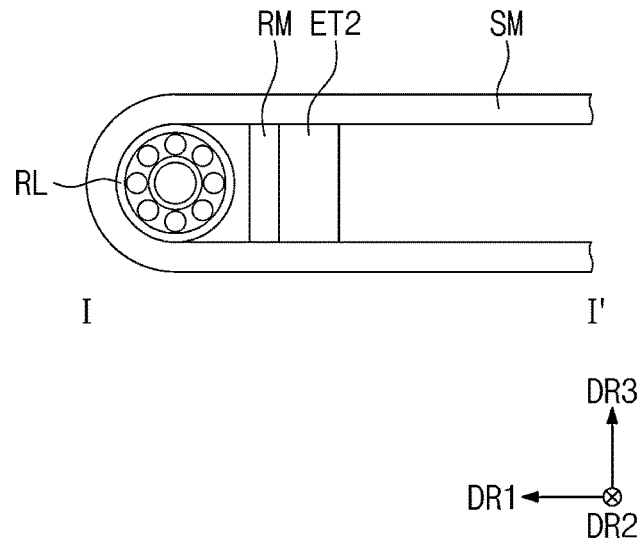
FIG. 6A is a cross-sectional view taken along line I-I' in FIG. 5A.
Figure 6B:
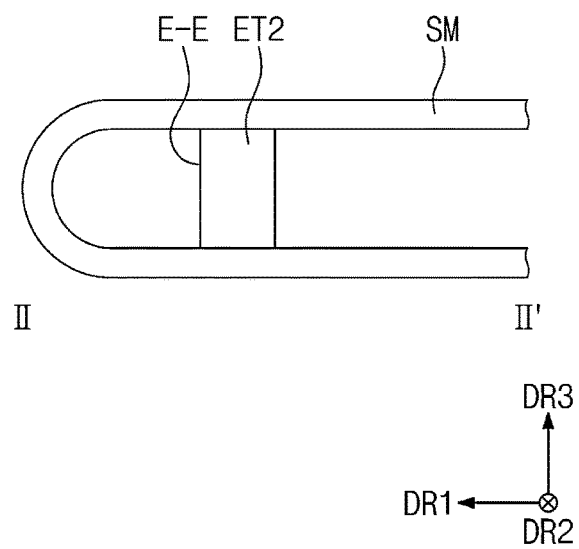
FIG. 6B is a cross-sectional view taken along line II-II' in FIG. 5A.

FIG. 5A is an exploded perspective view of a sliding part according to an embodiment of the invention. FIG. 5B is a plan view of a sliding part according to an embodiment of the invention. FIG. 6A is a cross-sectional view taken along line I-I' in FIG. 5A. FIG. 6B is a cross-sectional view taken along line II-II' in FIG. 5A.

Referring to FIGS. 5A and 5B, a sliding part SLM according to an embodiment may include a first guide part GD1 and a second guide part GD2. As illustrated in FIG. 5B, the second guide part GD2 may be disposed in the body part BDM (see FIG. 3) in a state of being coupled to the first guide part GD1.

The first guide part GD1 may include a first connecting part ET1 and first and second supports SP1 and SP2.

The first connecting part ET1 may extend in the second direction DR2. The first connecting part ET1 may be disposed between the first and second supports SP1 and SP2, and be connected to one end of each of the first and second supports SP1 and SP2. The first connecting part ET1 may be fixed to the first and second supports SP1 and SP2 through bolt-nut-coupling. However, an embodiment of the invention is not limited thereto. The first connecting part ET1 and the first and second supports SP1 and SP2 may be provided as one body in another embodiment, and are not limited to any one embodiment.

The first and second supports SP1 and SP2 may be each extend in the first direction DR1, and may be spaced apart from each other with the first connecting part ET1 therebetween in the second direction DR2. Thus, a space that exposes the bottom surface B-B (see FIG. 3) of the body part BDM (see FIG. 3) may be defined between the first support SP1 and the second support SP2.

The first support SP1 may define a first groove H1 therein. The first groove H1 may be defined by a first inner surface U-S, a second inner surface B-S, and a third inner surface S-S of the first support SP1. The third inner surface S-S may be disposed between and be connected to the first inner surface U-S and the second inner surface B-S such that the first to third inner surfaces may form a "U" shape. The third inner surface S-S may correspond to a portion of the "U" shape, which has a curved surface.

The first inner surface U-S and the second inner surface B-S may face each other in the third direction DR3, and the third inner surface S-S may be connected to one end of each of the first inner surface U-S and the second inner surface B-S. The one end of each of the first inner surface U-S and the second inner surface B-S may be more adjacent to the first connecting part ET1 than the other end thereof is. Thus, the first groove H1 may have one side that is opened.

The second support SP2 may define a second groove H2 therein. The second groove H2 may be defined by a first inner surface U-S, a second inner surface B-S, and a third inner surface S-S of the second support SP2. The third inner surface S-S may be disposed between and be connected to the first inner surface U-S and the second inner surface B-S such that the first to third inner surfaces may form a "U" shape. The third inner surface S-S may correspond to a portion of the "U" shape, which has a curved surface.

The first inner surface U-S and the second inner surface B-S may face each other in the third direction DR3, and the third inner surface S-S may be connected to one end of each of the first inner surface U-S and the second inner surface B-S. The one end of each of the first inner surface U-S and the second inner surface B-S may be more adjacent to the first connecting part ET1 than the other end thereof is. Thus, the second groove H2 may have one side that is opened.

The second guide part GD2 may include a second connecting part ET2, third and fourth supports CN1 and CN2, and a rolling part RM.

The second connecting part ET2 may extend in the second direction DR2. The second connecting part ET2 may be spaced apart from the first connecting part ET1. The second connecting part ET2 may be connected to one end of each of the third and fourth supports CN1 and CN2. The second connecting part ET2 may be fixed to the third and fourth supports CN1 and CN2 through bolt-nut-coupling. However, an embodiment of the invention is not limited thereto. The second connecting part ET2 and the third and fourth supports CN1 and CN2 may be provided as one body in another embodiment, and are not limited to any one embodiment.

The third support CN1 may be disposed inside the first groove H1 of the first support SP1. According to an embodiment, the first groove H1 may have a width that is greater than a width of the third support CN1 in the first direction DR1. The first groove H1 may have a width that is greater than a width of the third support CN1 in the third direction DR3.

The fourth support CN2 may be disposed inside the second groove H2 of the second support SP2. According to an embodiment, the second groove H2 may have a width that is greater than a width of the fourth support CN2 in the first direction DR1. The second groove H2 may have a width that is greater than a width of the fourth support CN2 in the third direction DR3.

As the third support CN1 and the fourth support CN2 are disposed inside the first and second grooves H1 and H2, respectively, the second guide part GD2 may be stably coupled to the first guide part GD1.

According to an embodiment, the first guide part GD1 may further include a hook, a fixing pin or the like, which fixes each of the third and fourth supports CN1 and CN2, so that the third and fourth supports CN1 and CN2 are not moved inside the grooves H1 and H2 corresponding thereto, respectively, in the first direction DR1.

The rolling part RM may be disposed in the second connecting part ET2. The rolling part RM may be disposed in one surface E-E of the second connecting part ET2, which faces the first connecting part ET1 in the first direction DR1. In more detail, the second connecting part ET2 may define a groove that is recessed from the one surface E-E in the first direction DR1, and the rolling part RM may be disposed in and coupled to the groove.

The rolling part RM may include at least one roller RL. The plurality of rollers RL may be constituted by a bearing, which is connected by a fixed shaft and rotatable around the fixed shaft, or the like. According to an embodiment, the rolling part RM may be provided in plurality. The rolling parts RM provided in plurality may be disposed to be spaced apart from each other on the second connecting part ET2 in the second direction DR2.

According to an embodiment of the invention, only opposite ends of each of the upper plate LTP (see FIG. 4) and/or the support plate MTP (see FIG. 4) of the panel module SM (see FIG. 4) in the second direction DR2 may be disposed inside the first and second grooves H1 and H2 of the first guide part GD1. Accordingly, stress applied to the display module DM may be effectively minimized when a mode of the display device DD is changed. In addition, the display device DD with improved sliding operation and assembly quality may be provided. However, an embodiment of the invention is not limited thereto, and opposite ends of the panel module SM may be also disposed inside the first and second grooves H1 and H2 in another embodiment.

Referring to FIGS. 6A and 6B, the rollers RL of the rolling part RM may be in contact with the panel module SM in a state in which the panel module SM is coupled to the sliding part SLM. In addition, the panel module SM may be disposed with a predetermined space from the one surface E-E, in which the rolling part RM is disposed, in the first direction DR1. According to an embodiment, the one surface E-E in which the rolling part RM is disposed, i.e., the one surface E-E facing the third inner surface S-S (see FIG. 5A), may be a flat surface. However, an embodiment of the invention is not limited thereto, and the one surface E-E may have at least a portion that is a curve surface in another embodiment.

According to an embodiment of the invention, when a mode of the display device DD is changed, the rolling parts RM may reduce friction occurring while the panel module SM (see FIG. 3) is bent in the sliding part SLM, and may guide the bending part D-1 of the panel module SM (see FIG. 3) such that the bending part D-1 may maintain a constant curvature. Accordingly, the panel module SM (see FIG. 3) may be more easily bent in the sliding part SLM.

Figure 7A:
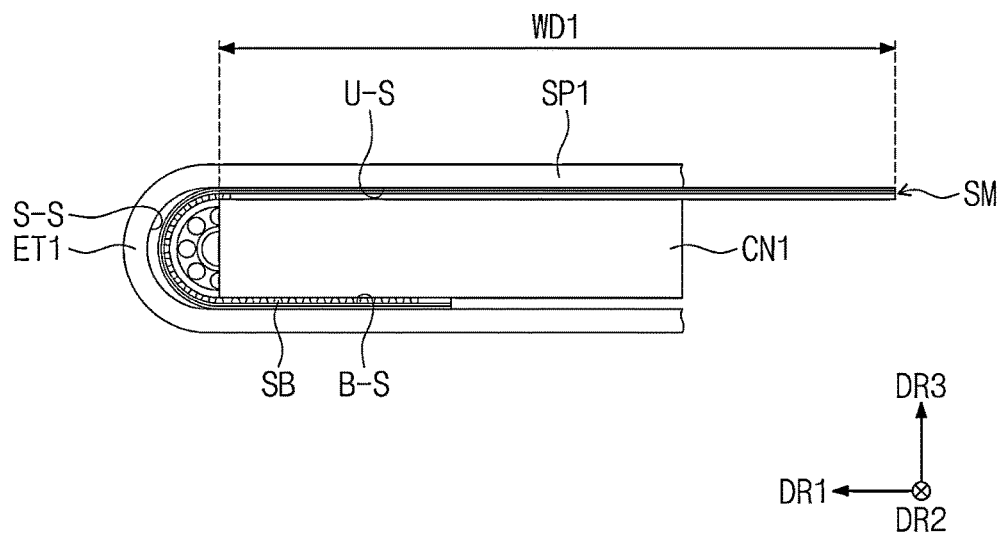
FIG. 7A is a cross-sectional view illustrating an arrangement relationship between a sliding part and a panel module in a first mode according to an embodiment of the invention.
Figure 7B:
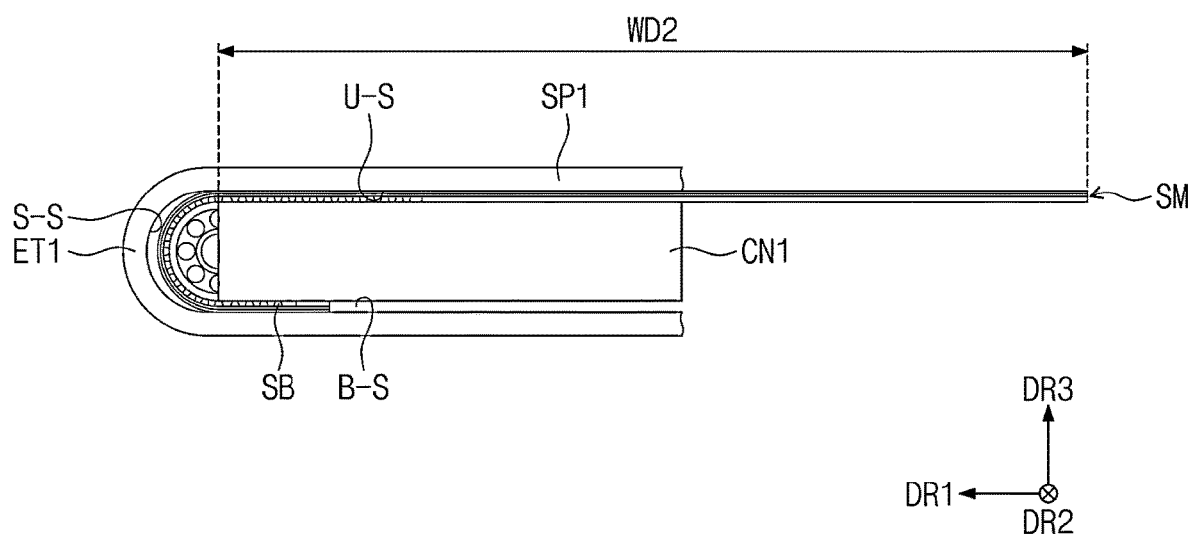
FIG. 7B is a cross-sectional view illustrating an arrangement relationship between a sliding part and a panel module in a second mode according to an embodiment of the invention.

FIG. 7A is a cross-sectional view illustrating an arrangement relationship between a sliding part and a panel module in a first mode according to an embodiment of the invention. FIG. 7B is a cross-sectional view illustrating an arrangement relationship between a sliding part and a panel module in a second mode according to an embodiment of the invention. Same/similar reference numbers or symbols refer to the same/similar elements as/to those described with reference to FIGS. 1 to 5B, and duplicate description is omitted.

FIGS. 7A and 7B illustrate a cross-sectional view of an arrangement relationship between a panel module SM and a sliding part SLM while a mode of the display device DD (see FIG. 1) is changed from the first mode to the second mode.

Referring to FIGS. 7A and 7B, in the first mode, a display surface of the display device DD (see FIG. 1) may have a first width WD1 in the first direction DR1. In the second mode, the display surface of the display device DD (see FIG. 2) may have a second width WD2 in the first direction DR1. The second width WD2 may be greater than the first width WD1. Thus, as a mode is changed from the first mode to the second mode, the area of the display surface of the display device DD (see FIGS. 1 and 2), which is provided for a user, may gradually increase.

The number of support bars SB disposed between a second inner surface B-S and the second guide part GD2 (see FIG. 5A) in the first mode may be larger than the number of the support bars SB disposed between a second inner surface B-S and the second guide part GD2 (see FIG. 5A) in the second mode.

According to an embodiment of the invention, as a mode is changed from the first mode to the second mode, a rolling part RM may be in contact with the support bars SB disposed to be far from a second portion M-2 (plate), among the support bars SB. Thus, as a mode is changed from the first mode to the second mode, the second connecting part ET2 (see FIG. 5B) may overlap the support bars SB disposed to be far from the second portion M-2 (plate), among the support bars SB.

Figure 8:
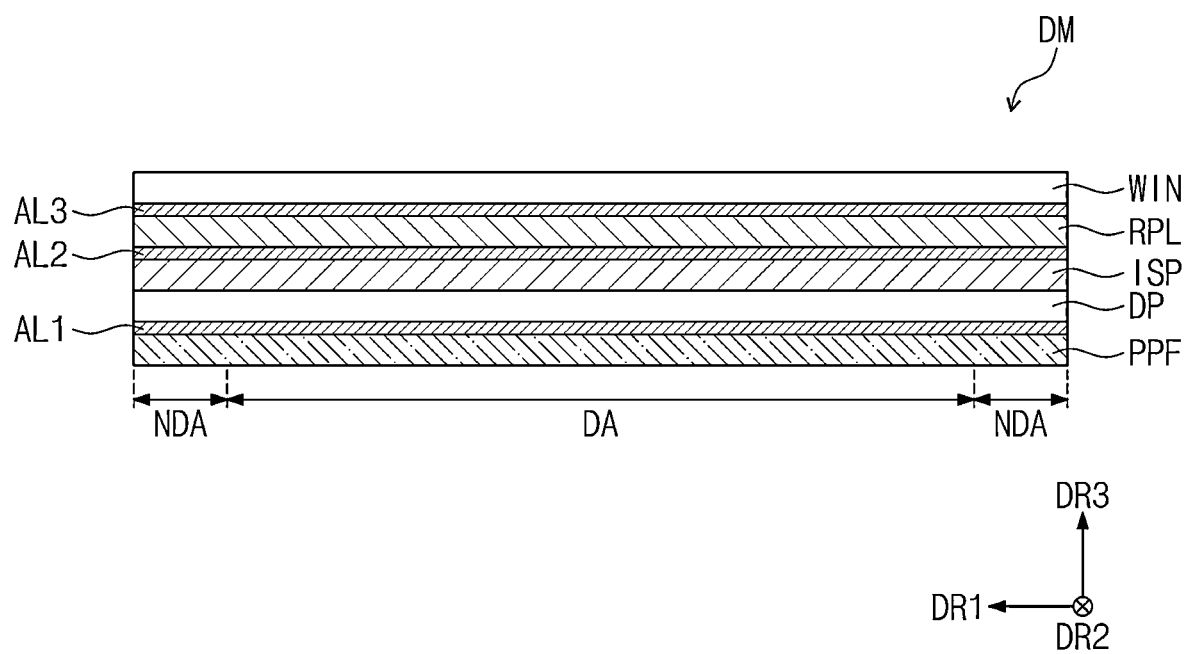
FIG. 8 is a cross-sectional view of a display device according to an embodiment of the invention.
Figure 9A:
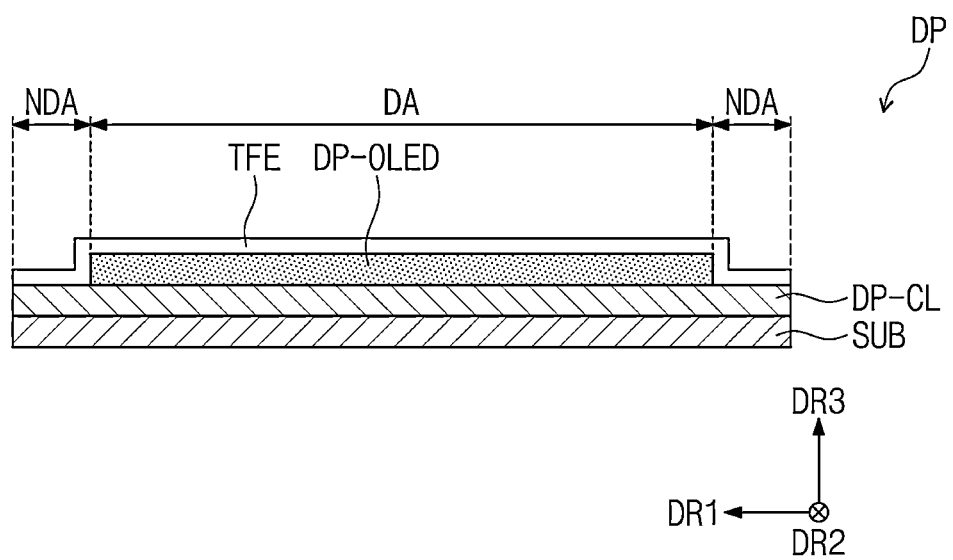
FIG. 9A is a cross-sectional view of a display panel according to an embodiment of the invention.
Figure 9B:
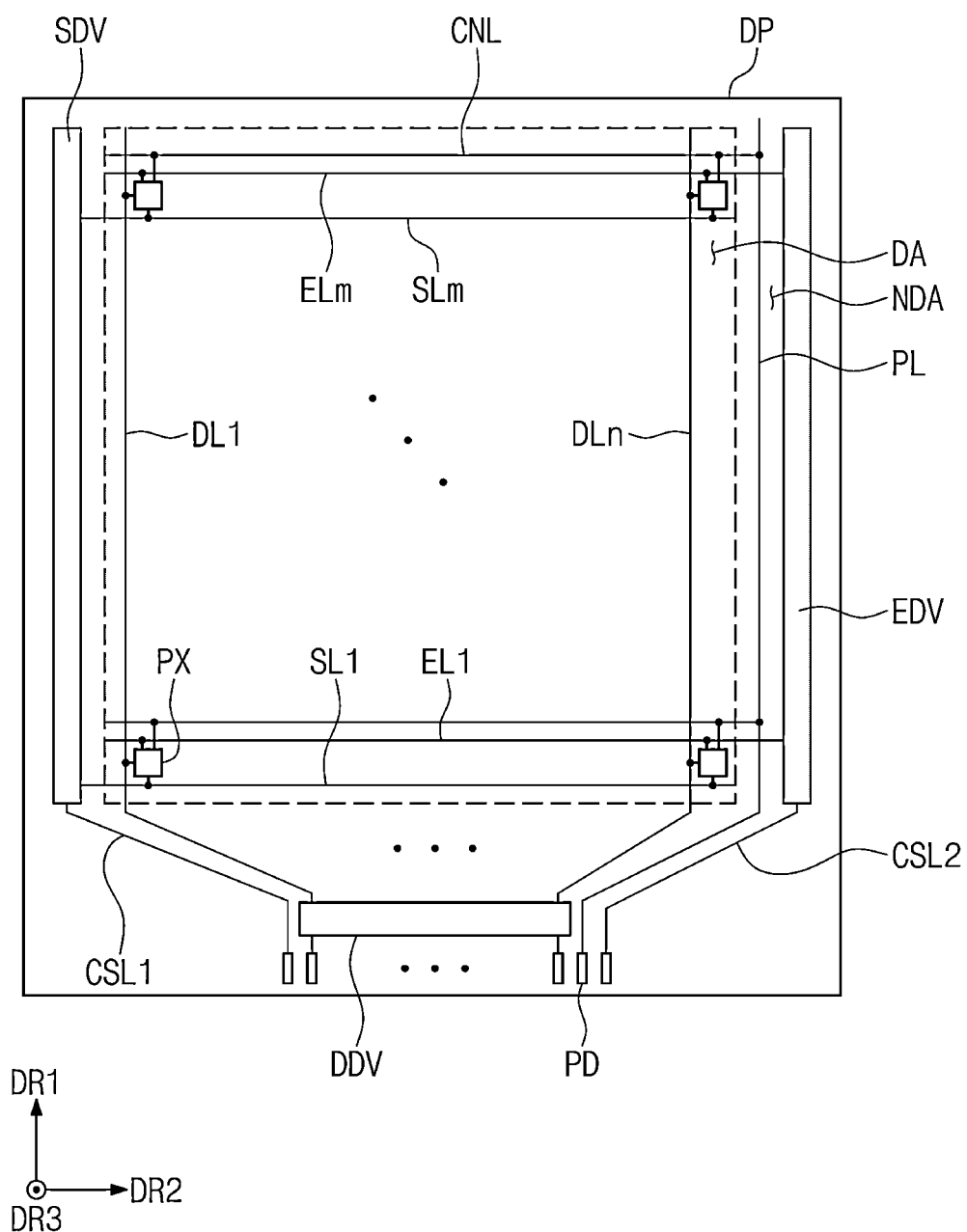
FIG. 9B is a plan view of a display panel according to an embodiment of the invention.

FIG. 8 is a cross-sectional view of a display device according to an embodiment of the invention. FIG. 9A is a cross-sectional view of a display panel according to an embodiment of the invention. FIG. 9B is a plan view of a display panel according to an embodiment of the invention.

FIG. 8 is a view exemplarily illustrating a cross section of the display module illustrated in FIG. 4.

Referring to FIG. 8, a display module DM may include a display panel DP, an input sensing part ISP, an anti-reflective layer RPL, a window WIN, a panel protective film PPF, and first to third adhesive layers AL1 to AL3.

The display panel DP may be a flexible display panel. The display panel DP according to an embodiment of the invention may be a light emitting display panel, and is not particularly limited. In an embodiment, for example, the display panel DP may be an organic light emitting display panel or an inorganic light emitting display panel. An emission layer of the organic light emitting display panel may include an organic luminescent material. An emission layer of the inorganic light emitting display panel may include a quantum dot, a quantum rod, and so on. Hereinafter, the display panel DP is described as the organic light emitting display panel.

The input sensing part ISP may be disposed on the display panel DP. The input sensing part ISP may include a plurality of sensors for detecting an external input by using a capacitance method, and sensing lines. The input sensing part ISP may be manufactured on the display panel DP through a continuous process during manufacture of a display device DD. Thus, a separate adhesive layer may not be omitted between the input sensing part ISP and the display panel DP. However, an embodiment of the invention is not limited thereto, and the input sensing part ISP may be manufactured as a separate panel from the display panel DP to be attached to the display panel DP through an adhesive layer in another embodiment.

The anti-reflective layer RPL may be disposed on the input sensing part ISP. The anti-reflective layer RPL may be defined as a film that prevents the reflection of external light. The anti-reflective layer RPL may reduce the reflectance of external light incident from above the display device DD toward the display panel DP.

When external light traveling toward the display panel DP is reflected by the display panel DP and provided for an external user again, the external light may be visible to the user like a mirror. To prevent such a phenomenon, the anti-reflection layer RPL may include, for example, a plurality of color filters that emit the same colors as pixels of the display panel DP, respectively.

The color filters may filter the external light to have the same colors as colors of the pixels, respectively. In this case, the external light may be invisible to the user. However, an embodiment of the invention is not limited thereto, and the anti-reflective layer RPL may include a retarder and/or a polarizer in order to reduce the reflectance of the external light in another embodiment.

The window WIN may be disposed on the anti-reflective layer RPL. The window WIN may protect the display panel DP, the input sensing part ISP, and the anti-reflective layer RPL from external scratches and impact.

The window WIN may have an optically transparent property. The window WIN may include glass. However, an embodiment of the invention is not limited thereto, and the window WIN may include a synthetic resin film in another embodiment.

The window WIN may have a multilayer structure or a single-layer structure. In an embodiment, for example, the window WIN may include the plurality of synthetic resin films coupled to each other through an adhesive, or include a glass substrate and a synthetic resin film that are coupled to each other through an adhesive.

The panel protective film PPF may be disposed below the display panel DP. The panel protective film PPF may protect a lower portion of the display panel DP. The panel protective film PPF may include a flexible plastic material such as polyethylene terephthalate ("PET").

The first adhesive layer AL1 may be disposed between the display panel DP and the panel protective film PPF, and the display panel DP and the panel protective layer film may be coupled to each other through the first adhesive layer AL1. The second adhesive layer AL2 may be disposed between the anti-reflective layer RPL and the input sensing part ISP, and the anti-reflective layer RPL and the input sensing part ISP may be coupled to each other through the second adhesive layer AL2. The third adhesive layer AL3 may be disposed between the window WIN and the anti-reflective layer RPL, and the window WIN and the anti-reflective layer RPL may be coupled to each other through the third adhesive layer AL3.

The first to third adhesive layers AL1 to AL3 may include a pressure sensitive adhesive ("PSA") or an optically clear adhesive ("OCA"), but the type of the adhesive is not limited thereto.

FIG. 9A is a view exemplarily illustrating a cross section of the display panel illustrated in FIG. 8.

Referring to FIG. 9A, the display panel DP may include a substrate SUB, a circuit element layer DP-CL disposed on the substrate SUB, a display element layer DP-OLED disposed on the circuit element layer DP-CL, and a thin-film encapsulation layer TFE disposed on the display element layer DP-OLED.

The substrate SUB may include a display region DA and a non-display region ND around the display region DA. The substrate SUB may include a flexible plastic material such as polyimide ("PI"). The display element layer DP-OLED may be disposed on the display region DA.

A plurality of pixels may be disposed in the circuit element layer DP-CL and the display element layer DP-OLED. Each of the pixels may include transistors, which are disposed in the circuit element layer DP-CL, and a light emitting element which is disposed in the display element layer DP-OLED and connected to the transistors. The configuration of the pixel will be described in detail below.

The thin-film encapsulation layer TFE may be disposed on the circuit element layer DP-CL so as to cover the display element layer DP-OLED. The thin-film encapsulation layer TFE may protect the pixels from moisture, oxygen, and external foreign matters.

FIG. 9B is a plan view of the display panel illustrated in FIG. 9A.

Referring to FIG. 9B, the display panel DP may include a scan driver SDV, a data driver DDV, an emission driver EDV, and a plurality of pads PD. The pads PD may be connected to the circuit board CB described with reference to FIG. 4.

The display panel DP may include a display region DA and a non-display region NDA surrounding the display region DA. The display panel DP may include a plurality of pixels PX, a plurality of scan lines SLI to SLm, a plurality of data lines DLI to DLn, a plurality of emission lines ELI to ELm, first and second control lines CSL1 and CSL2, first and second power lines PL1 and PL2, and connection lines CNL. Here, m and n are natural numbers.

The pixels PX may be disposed in the display region DA. The scan driver SDV and the emission driver EDV may be disposed in the non-display region NDA adjacent to the long sides, respectively, of the display panel DP. The data driver DDV may be disposed in the non-display region NDA adjacent to any one of the short sides of the display panel DP. The data driver DDV may be adjacent to a lower end of the display panel DP when viewed on a plan view.

The scan lines SLI to SLm may extend in the second direction DR2 to be connected to the pixels PX and the scan driver SDV. The data lines DLI to DLn may extend in the first direction DR1 to be connected to the pixels PX and the data driver DDV. The emission lines ELI to ELm may extend in the second direction DR2 to be connected to the pixels PX and the emission driver EDV.

The power line PL may extend in the first direction DR1 to be disposed in the non-display region NDA. The power line PL may be disposed between the display region DA and the emission driver EDV. However, an embodiment of the invention is not limited thereto, and the power line PL may be disposed between the display region DA and the scan driver SDV in another embodiment.

The connection lines CNL may extend in the second direction DR2 and be arranged in the first direction DR1 to be connected to the power line PL and the pixels PX. The driving voltage may be applied to the pixels PX through the power line PL and the connection lines CNL, which are connected to each other.

The first control line CSL1 may be connected to the scan driver SDV and extend toward a lower end of the display panel DP. The second control line CSL2 may be connected to the emission driver EDV and extend toward the lower end of the display panel DP. The data driver DDV may be disposed between the first control line CSL1 and the second control line CSL2.

The data lines DLI to DLn may be connected to corresponding pads PD, respectively, through the data driver DDV. In an embodiment, for example, the data lines DLI to DLn may be connected to the data driver DDV, and the data driver DDV may be connected to the pads PD corresponding to the data lines DLI to DLn, respectively.

The data lines DLI to DLn may be connected to the data driver DDV, and the data driver DDV may be connected to the pads PD corresponding to the data lines DLI to DLn.

Although not illustrated, a printed circuit board may be connected to the pads PD, and a timing controller and a voltage generator may be disposed on the printed circuit board. The timing controller may be manufactured as an integrated circuit chip and mounted on the printed circuit board. The timing controller and the voltage generator may be connected to the pads PD through the printed circuit board.

A scan control signal may be provided for the scan driver SDV through the first control line CSL1. An emission control signal may be provided for the emission driver EDV through the second control line CSL2. A data control signal may be provided for the data driver DDV. The timing controller may receive image signals from the outside, and may convert a data format of the image signals to match an interface specification of the data driver DDV and provide the signals for the data driver DDV.

The scan driver SDV may generate a plurality of scan signals in response to the scan control signal. The scan signals may be applied to the pixels PX through the scan lines SLI to SLm. The scan signals may be sequentially applied to the pixels PX.

The data driver DDV may generate a plurality of data voltages corresponding to the image signals in response to the data control signal. The data voltages may be applied to the pixels PX through the data lines DLI to DLn. The emission driver EDV may generate a plurality of emission signals in response to the emission control signal. The emission signals may be applied to the pixels PX through the emission lines ELI to ELm.

The pixels PX may be provided with the data voltages in response to the scan signals. The pixels PX may emit light with brightness corresponding to the data voltages in response to the emission signals to display an image. An emission time of the pixels PX may be controlled by the emission signals.

Figure 10:
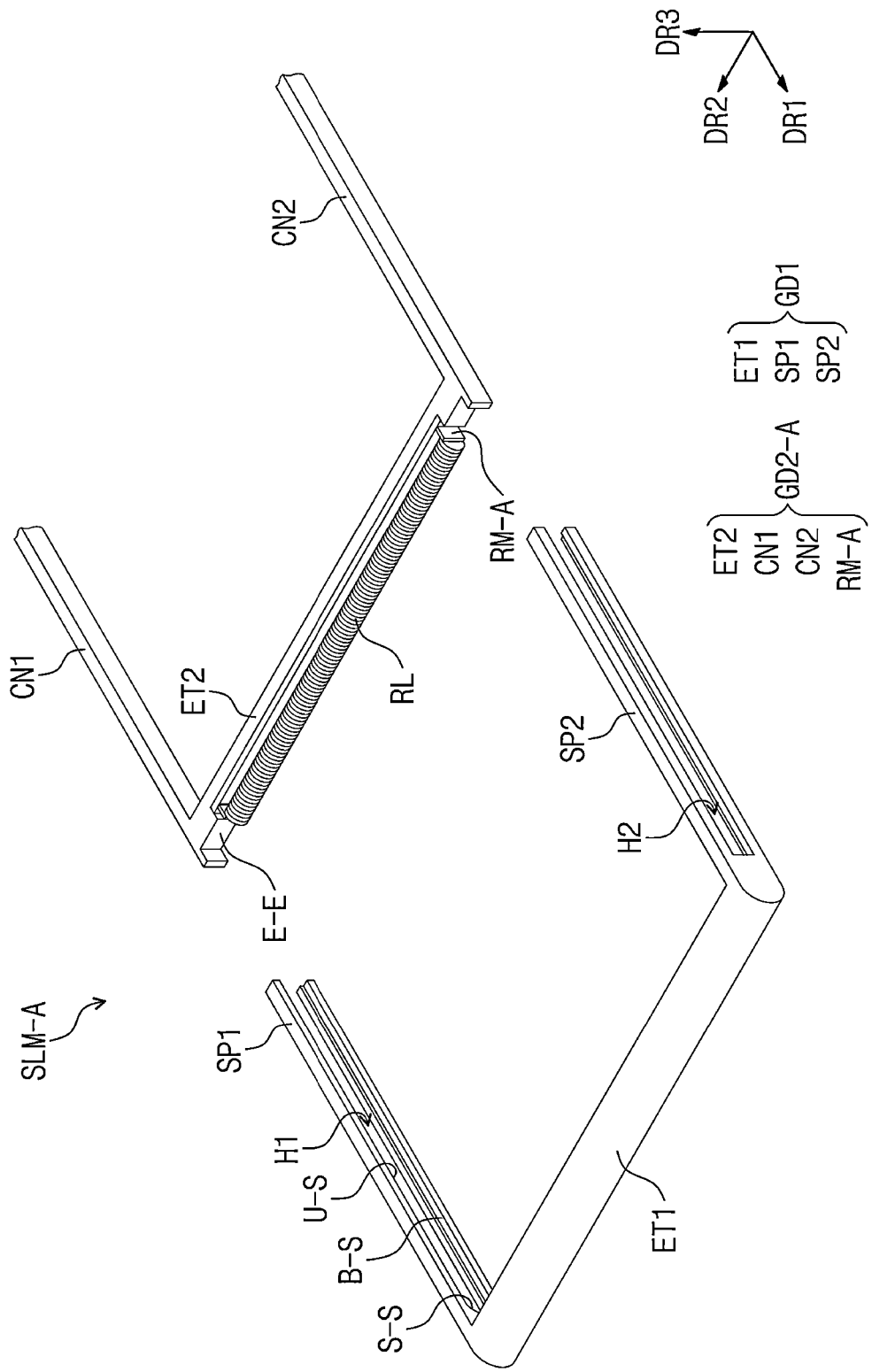
FIG. 10 is an exploded perspective view of a sliding part according to another embodiment of the invention.
Figure 11:
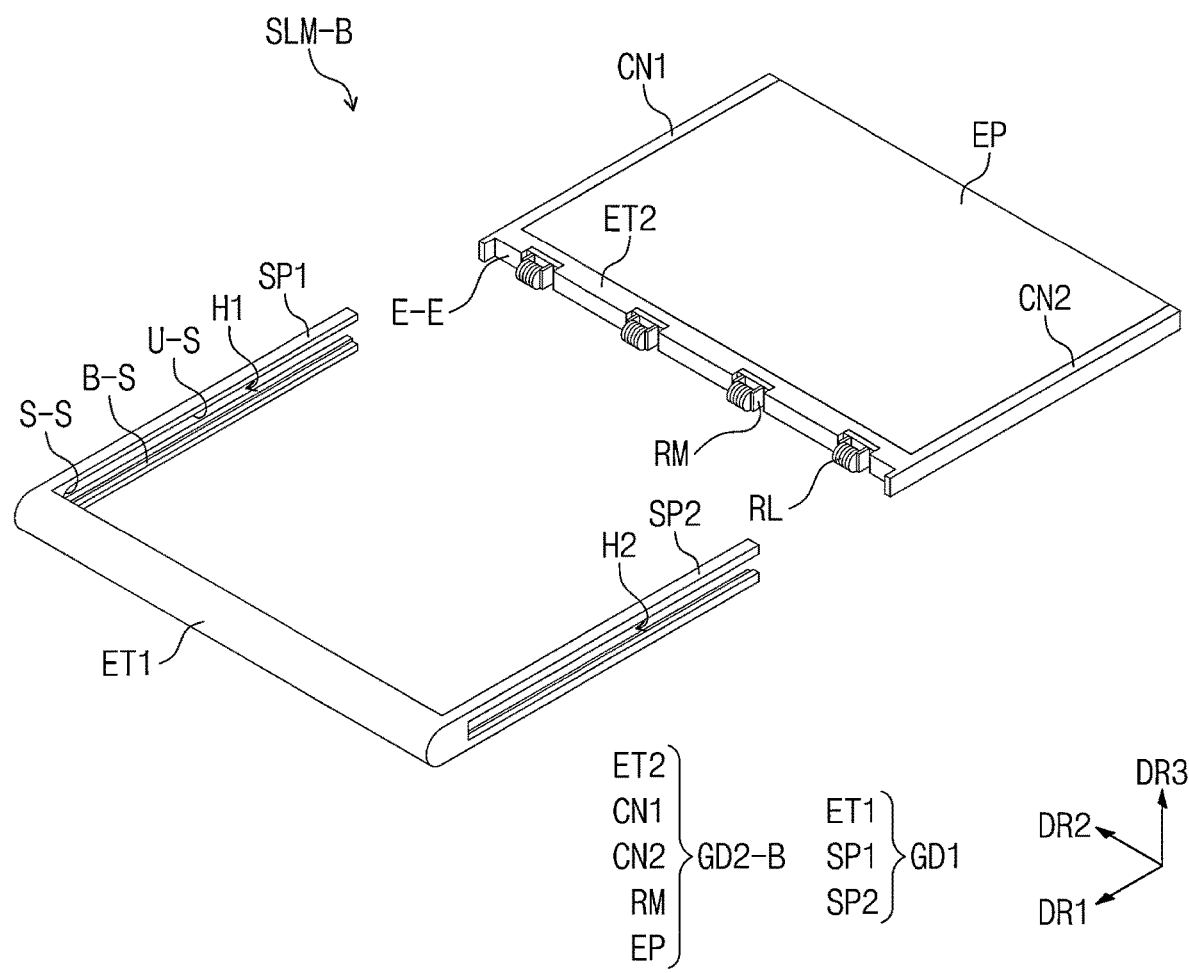
FIG. 11 is an exploded perspective view of a sliding part according to still another embodiment of the invention.

FIG. 10 is an exploded perspective view of a sliding part according to another embodiment of the invention. FIG. 11 is an exploded perspective view of a sliding part according to still another embodiment of the invention. Same/similar reference numbers or symbols refer to the same/similar elements as/to those described with reference to FIGS. 1 to 5B, and duplicate description is omitted.

Referring to FIG. 10, a sliding part SLM-A according to an embodiment may include a first guide part GD1 and a second guide part GD2-A. The second guide part GD2-A may be fitted into a predetermined space defined in the first guide part GD1. The first portion S-1 (see FIG. 3) of the panel module SM (see FIG. 3) may be coupled to the first guide part GD1 through the second guide part GD2-A.

The first guide part GD1 may include a first connecting part ET1 and first and second supports SP1 and SP2.

The first and second supports SP1 and SP2 may be spaced apart from each other in the second direction DR2, and the first connecting part ET1 may be connected to one end of each of the first and second supports SP1 and SP2. The first support SP1 may define a first groove H1 therein. The first groove H1 may be defined by a first inner surface U-S, a second inner surface B-S, and a third inner surface S-S of the first support SP1, which are connected to each other to have a "U" shape. The first inner surface U-S and the second inner surface B-S may face each other in the third direction DR3, and the third inner surface S-S may be connected to one end of each of the first inner surface U-S and the second inner surface B-S. The third inner surface S-S may have a predetermined curvature.

The second support SP2 may define a second groove H2 therein. The second groove H2 may be defined by a first inner surface U-S, a second inner surface B-S, and a third inner surface S-S of the second support SP2, which are connected to each other to have a "U" shape. The first inner surface U-S and the second inner surface B-S may face each other in the third direction DR3, and the third inner surface S-S may be connected to one end of each of the first inner surface U-S and the second inner surface B-S. The third inner surface S-S may have a predetermined curvature.

The second guide part GD2-A according to an embodiment may include a second connecting part ET2, third and fourth supports CN1 and CN2, and a rolling part RM-A. The third and fourth supports CN1 and CN2 may be spaced apart from each other in the second direction DR2, and the second connecting part ET2 may be connected to one end of each of the third and fourth supports CN1 and CN2. The third support CN1 may be disposed inside the first groove H1 of the first support SP1, and the fourth support CN2 may be disposed inside the second groove H2 of the second support SP2.

The rolling part RM-A according to an embodiment may be disposed in the second connecting part ET2. The rolling part RM-A may be one rolling part RM-A that extends along the second connecting part ET2 in the second direction DR2. The rolling part RM-A may be disposed in one surface E-E of the second connecting part ET2, which faces the first connecting part ET1 in the first direction DR1. In more detail, the second connecting part ET2 may define a groove that is recessed from the one surface E-E in the first direction DR1, and the rolling part RM-A may be disposed in and coupled to the one groove defined in the second connecting part ET2.

The rolling part RM-A may include rollers RL arranged in the second direction DR2. The plurality of rollers RL may be constituted by a bearing that is connected by a fixed shaft and rotatable around the fixed shaft.

As described in FIGS. 7A and 7B, the panel module SM (see FIG. 7A) may be in contact with the rolling part RM-A when a mode of the display device DD (see FIG. 1) is changed. According to this embodiment, as a width of the rolling part RM-A in contact with the panel module SM (see FIG. 7A) increases, friction occurring while the panel module SM (see FIG. 7A) is bent in the sliding part SLM-A may be reduced.

Referring to FIG. 11, a sliding part SLM-B according to an embodiment may include a first guide part GD1 and a second guide part GD2-B. The second guide part GD2-B may be fitted into a predetermined space defined in the first guide part GD1. The first portion S-1 (see FIG. 3) of the panel module SM (see FIG. 3) may be coupled to the first guide part GD1 through the second guide part GD2-B.

The first and second guide parts GD1 and GD2-B included in the sliding part SLM-B may correspond to the first and second guide parts GD1 and GD2, respectively, which are included in the sliding part SLM described with reference to FIG. 5A. The description will be focused on differences.

The second guide part GD2-B according to an embodiment may further include a reinforcement part EP disposed among third and fourth supports CN1 and CN2 and a second connecting part ET2. The reinforcement part EP may be disposed in a space defined among the third and fourth supports CN1 and CN2 and the second connecting part ET2. Thus, the second guide part GD2-B may be provided in a plate shape.

In the second guide part GD2-B according to an embodiment, the empty space among the third and fourth supports CN1 and CN2 and the second connecting part ET2 may be filled to prevent a second portion S-2 of the panel module SM (see FIG. 3) from sagging by the load in a state the panel module SM (see FIG. 3) is coupled to the sliding part SLM-B. Accordingly, the display device DD with improved assembly quality may be provided.

Figure 12A:
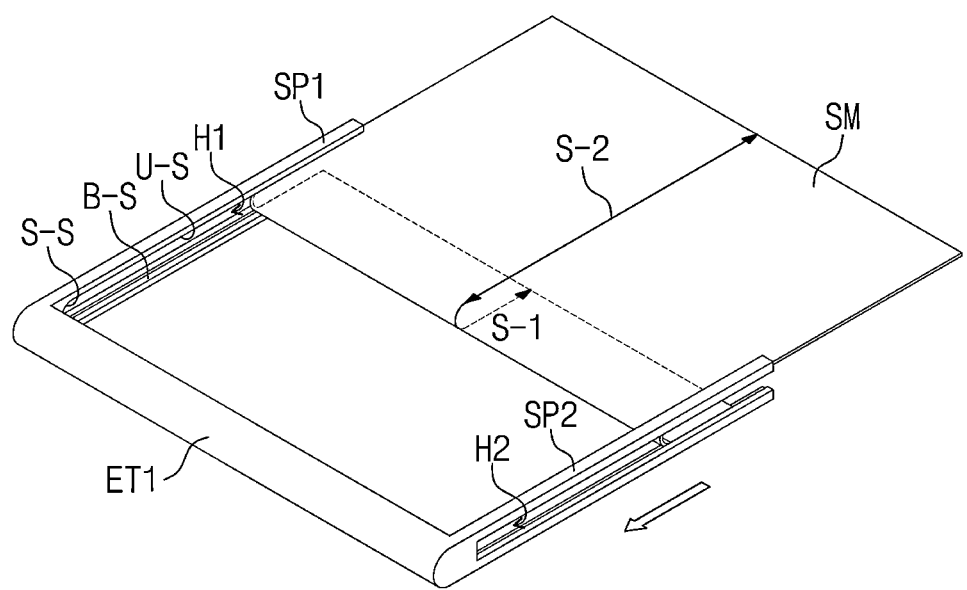
FIG. 12A is a perspective view of a display device manufacturing method according to an embodiment of the invention.
Figure 12B:
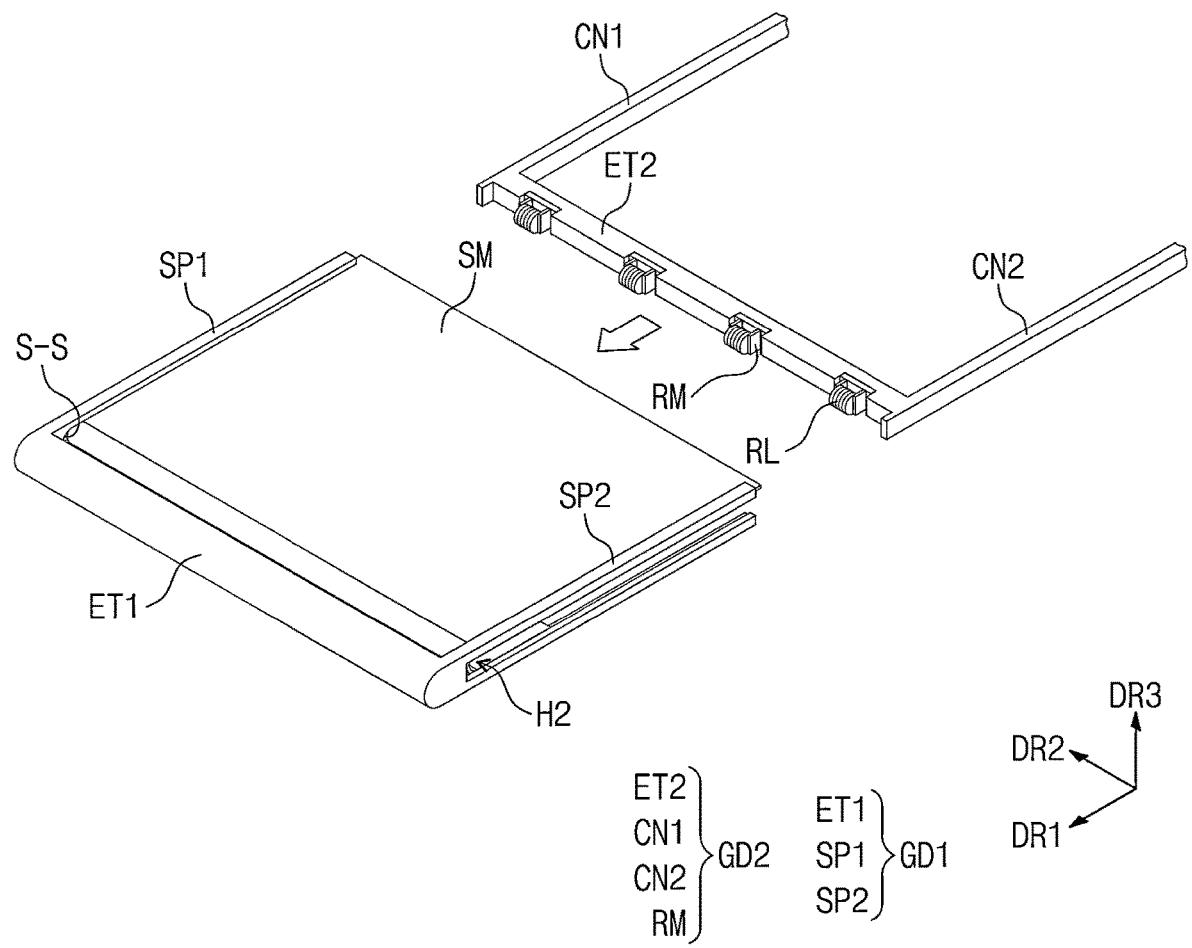
FIG. 12B is a perspective view of a display device manufacturing method according to an embodiment of the invention.
Figure 12C:
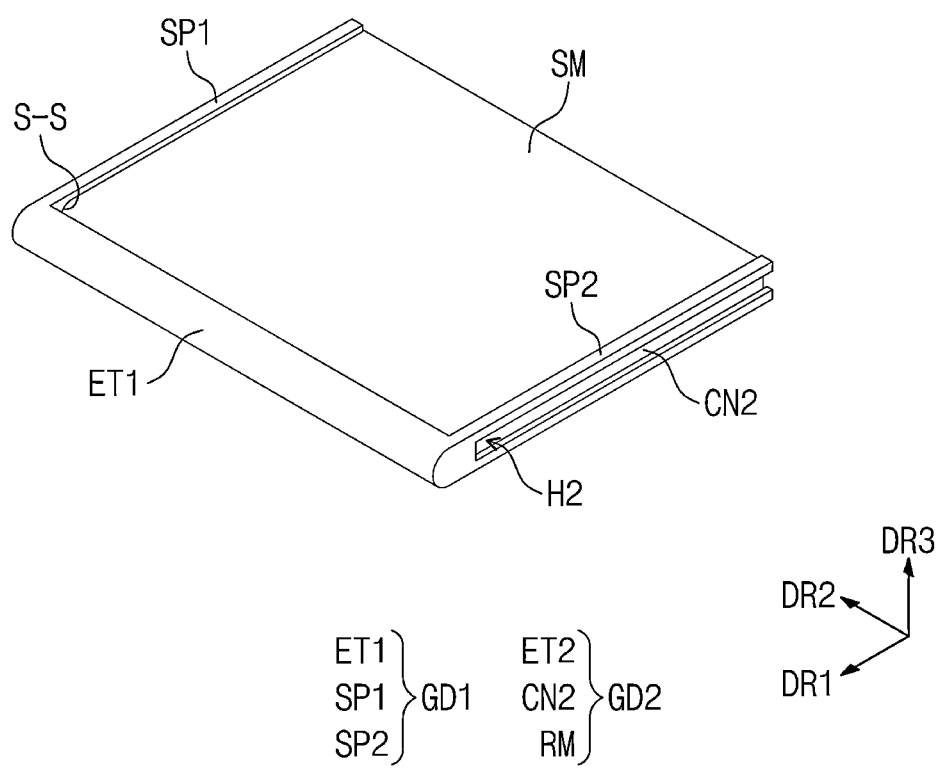
FIG. 12C is a perspective view of a display device manufacturing method according to an embodiment of the invention.

FIG. 12A is a perspective view of a display device manufacturing method according to an embodiment of the invention. FIG. 12B is a perspective view of a display device manufacturing method according to an embodiment of the invention. FIG. 12C is a perspective view of a display device manufacturing method according to an embodiment of the invention. Same/similar reference numbers or symbols refer to the same/similar elements as/to those described with reference to FIGS. 1 to 5B, and duplicate description is omitted.

A display device manufacturing method according to an embodiment may include preparing a first guide part GD1 including a first support SP1 and a second support SP2, which define grooves H1 and H2, respectively, extending in the first direction DR1 and are spaced apart from each other in the second direction DR2, and a first connecting part ET1 which is connected to each of the first support SP1 and the second support SP2.

In addition, the display device manufacturing method may include inserting a panel module SM and a second guide part GD2 into the groove of each of the first support SP1 and the second support SP2 in the first direction DR1. The panel module SM may include a first portion S-1 having one region having a curvature, and a second portion S-2 that is connected to the first portion S-1 and is a flat surface.

In the display device manufacturing method according to an embodiment of the invention, in the inserting of the panel module SM and the second guide part GD2, the one region of the first portion S-1, which has a curvature, may be inserted to be close to the first connecting part ET1 in the first direction DR1, and the panel module SM may be disposed between the first guide part GD1 and the second guide part GD2, in the groove of each of the first support SP1 and the second support SP2.

Hereinafter, a display apparatus manufacturing method according to an embodiment will be described with reference to FIGS. 12A to 12C.

Referring to FIGS. 12A to 12C, the display apparatus manufacturing method according to an embodiment may include providing a first guide part GD1. The first guide part GD1 may include a first connecting part ET1 and first and second supports SP1 and SP2.

The first and second supports SP1 and SP2 may be spaced apart from each other in the second direction DR2, and the first connecting part ET1 may be connected to one end of each of the first and second supports SP1 and SP2. A first groove H1 may be defined in the first support SP1. A second groove H2 may be defined in the second support SP2.

The first groove H1 may be defined by a first inner surface U-S, a second inner surface B-S, and a third inner surface S-S of the first support SP1, and the second groove H2 may be defined by a first inner surface U-S, a second inner surface B-S, and a third inner surface S-S of the second support SP2. The corresponding first inner surface U-S, second inner surface B-S, and third inner surface S-S may be connected to each other to have a "U" shape, and the third inner surface S-S may have a curved surface.

The display apparatus manufacturing method according to an embodiment may include providing a panel module SM. The panel module SM may include the display module DM, the upper plate LTP, and the support plate MTP, described with reference to FIG. 4. The panel module SM according to an embodiment may be a flexible plate. The panel module SM may include a first portion S-1 having one portion bent with a predetermined curvature, and a second portion S-2 connected to the first portion S-1.

Thereafter, the display apparatus manufacturing method according to an embodiment may include inserting the bent panel module SM and a second guide part GD2 into the first guide part GD1.

In the inserting of the panel module SM and the second guide part GD2 into the first guide part GD1, a portion of the first portion S-1, which is bent to have a predetermined curvature, may be inserted to be close to the first connecting part ET1 in the first direction DR1.

According to an embodiment, in the inserting of the panel module SM and the second guide part GD2 into the first guide part GD1, the panel module SM may be first inserted into the first guide part GD1 and then, the second guide part GD2 may be inserted into the first guide part GD1, or the panel module SM and the second guide part GD2 may be inserted into the first guide part GD1 at the same time in a state of being coupled to each other. However, the inserting of the panel module SM and the second guide part GD2 into the first guide part GD1 is not limited to any one embodiment.

The second guide part GD2 may include a second connecting part ET2, third and fourth supports CN1 and CN2, and a rolling part RM. The third and fourth supports CN1 and CN2 may be spaced apart from each other in the second direction DR2, and the second connecting part ET2 may be connected to one end of each of the third and fourth supports CN1 and CN2.

In the inserting of the panel module SM and the second guide part GD2 into the first guide part GD1, the third support CN1 may be inserted into a first groove H1 of the first support SP1, and the fourth support CN2 may be inserted into a second groove H2 of the second support SP2.

In more detail, the third support CN1 may be inserted between portions of the panel module SM, each of which overlap the first support SP1, in a space defined by bending the first support S-1. The third support CN1 may be disposed inside the first groove H1 after the inserting of the second guide part GD2. The fourth support CN2 may be disposed inside the second groove H2 after the inserting is performed.

A rolling part RM of the second guide part GD2 may include rollers RL arranged in the second direction DR2. The rolling part RM may be in contact with the bent portion of the first support S-1 while the second guide part GD2 is inserted into the grooves H1 and H2 of to the first guide part GD1. Accordingly, the second guide part GD2 may be disposed inside the first guide part GD1 in a state in which a shape of the bent portion of the first support S-1 is maintained by the second guide part GD2.

According to an embodiment of the invention, stress applied to support bars during a sliding operation may be reduced. Accordingly, a display device effectively improves sliding operation and assembly quality and a method for manufacturing the display device may be provided.

Although the embodiments of the present invention have been described, it is understood that the present invention should not be limited to these embodiments but various changes and modifications can be made by one ordinary skilled in the art within the spirit and scope of the present invention as hereinafter claimed.

Therefore, the technical scope of the invention is not limited to the contents described in the detailed description of the specification, but should be determined by the claims.

What is claimed is:

1. A display device comprising:
a display module comprising a bending part and a flat part extending from the bending part in a first direction;
a support plate disposed below the display module, and comprising a first portion overlapping the bending part and a second portion overlapping the flat part; and
a sliding part configured to accommodate at least a portion of the support plate,
wherein the sliding part comprising:
a first guide part comprising a first support and a second support, each of which defines a groove therein extending in the first direction and which are spaced apart from each other in a second direction crossing the first direction, and a first connecting part extending in the second direction and which is connected to each of the first support and the second support; and
a second guide part comprising a third support disposed in the groove of the first support, a fourth support disposed in the groove of the second support, and a second connecting part extending in the second direction and connected to each of the third support and the fourth support,
wherein the bending part and the first portion are bent with respect to the second connecting part,
wherein the first connection part, bent portions of the bending part and the first portion, and the second connection part are arranged in the first direction in this order,
wherein the first portion has opposite ends that are disposed in the groove of the first support and the groove of the second support, respectively.

2. The display device of claim 1, wherein the display module has a width that gradually increases in the first direction as a mode is changed from a first mode to a second mode.

3. The display device of claim 2, wherein the groove of each of the first support and the second support is defined by a first inner surface and a second inner surface, which face each other in a third direction crossing the first direction and the second direction, and a third inner surface connecting the first inner surface and the second inner surface to each other and having a curved surface,
wherein the first inner surface has one portion that faces the flat part of the display module,
wherein the third inner surface is disposed between and connected to the first inner surface and the second inner surface such that the first to third inner surfaces may form a "U" shape.

4. The display device of claim 3, wherein the first portion comprises support bars that are arranged in the first direction and extend in the second direction,
wherein a total number of the support bars disposed between the second inner surface and the second guide part in the first mode is larger than a total number of the support bars disposed between the second inner surface and the second guide part in the second mode.

5. The display device of claim 3, wherein one surface of the second connecting part, which faces the third inner surface, has at least a portion that is a curved surface.

6. The display device of claim 2, wherein, as the mode is changed from the first mode to the second mode, the second connecting part is gradually away from a boundary between the first portion and the second portion.

7. The display device of claim 2, further comprising a body part in which the first support and the second support are accommodated, wherein, as the mode is changed from the first mode to the second mode, the first connecting part is gradually away from the body part in the first direction.

8. The display device of claim 1, wherein the second guide part further comprises a rolling part disposed in the second connecting part and provided with at least one roller.

9. The display device of claim 8, wherein the rolling part is provided in plurality, and the plurality of rolling parts are spaced apart from each other in the second direction.

10. The display device of claim 1, further comprising an upper plate disposed between the display module and the support plate and having an opening portion in a region overlapping the bending part.

11. The display device of claim 1, further comprising a circuit board connected to one end of the flat part and having one portion that is bent to face the support plate.

12. The display device of claim 1, wherein each of the grooves has a width that is greater than a width of each of the third support and the fourth support in the first direction.

13. The display device of claim 1, wherein the first connecting part and the second connecting part are spaced apart from each other by a predetermined distance in the first direction.

14. The display device of claim 1, wherein the display module comprises a display panel configured to provide an image, an input sensing part disposed on the display panel, an anti-reflective layer disposed on the input sensing part, a window disposed on the anti-reflective layer, and a protective film disposed below the display panel.

15. The display device of claim 1, wherein the second guide part further comprises a reinforcement part disposed between the third support and the fourth support.

16. A display device manufacturing method comprising:

preparing a first guide part comprising a first support and a second support, each of which defines a groove therein extending in a first direction and which are spaced apart from each other in a second direction crossing the first direction, and a first connecting part connected to each of the first support and the second support; and inserting a panel module and a second guide part into the groove of each of the first support and the second support in the first direction, wherein, in the inserting of the panel module and the second guide part, the panel module comprises a first portion having one region having a curvature, and a second portion connected to the first portion, and the one region is inserted to be close to the first connecting part in the first direction, the second guide part includes a second connecting part extending in the second direction, the first connection part, the one region of the panel module, and the second connection part are arranged in the first direction in this order, and the panel module is disposed between the first guide part and the second guide part in the groove of each of the first support and the second support.

17. The display device manufacturing method of claim 16, wherein the second guide part comprises a rolling part provided with at least one roller, wherein the rolling part is disposed to face the one region.

18. The display device manufacturing method of claim 17, wherein the at least one roller is disposed in the second connecting part, and wherein the second guide part further comprises a third support and a fourth support, each of which is connected to the second connecting part and extends in the first direction and which are spaced apart from each other in the second direction, wherein the third support is disposed in the groove of the first support, and the fourth support is disposed in the groove of the second support.

19. A display device comprising:

a display module comprising a bending part having one portion that is bendable to have a curvature, and a flat part arranged with the bending part in a first direction;

a support plate comprising a first portion overlapping the bending part and a second portion overlapping the flat part, and configured to support the display module;

a first guide part defining a first groove and a second groove therein, each of which extends in the first direction and which are spaced apart from each other in a second direction crossing the first direction; and a second guide part comprising a rolling part and inserted into each of the first groove and the second groove, wherein the first portion has opposite ends that are disposed inside the first groove and the second groove, respectively, wherein the rolling part is in contact with a portion of the first portion, which has a curvature, wherein the portion of the first portion, which has the curvature, is gradually away from the second portion as a mode is changed from a first mode to a second mode, wherein the first guide part comprises a first connecting part extending in the second direction, and a first support and a second support, each of which is connected to the first connecting part and in which the first groove and the second groove are defined, respectively, and the second guide part comprises a second connecting part facing the first connecting part in the first direction and extending in the second direction, a third support disposed inside the first groove, and a fourth support disposed inside the second groove.

* * * * *